United States Patent [19]

LoCicero et al.

[11] Patent Number: 4,564,857

[45] Date of Patent: Jan. 14, 1986

[54] ASPECT RATIO IMPROVEMENT FOR COMPATIBLE HIGH-DEFINITION TELEVISION

[75] Inventors: Joseph L. LoCicero, Riverside; Melih Pazarci, Chicago; Theodore S. Rzeszewski, Lombard, all of Ill.

[73] Assignee: AT&T Bell Laboratories, Murray Hill, N.J.

[21] Appl. No.: 584,526

[22] Filed: Feb. 28, 1984

[51] Int. Cl.$^4$ .................... H04N 11/20; H04N 11/06
[52] U.S. Cl. ........................................ 358/11; 358/12
[58] Field of Search ...................... 358/11, 12, 13, 14, 358/16, 56

[56] References Cited

U.S. PATENT DOCUMENTS

| | | | |
|---|---|---|---|
| 2,686,831 | 8/1954 | Dome | 358/241 |
| 3,617,626 | 11/1969 | Bluth | 178/6.6 A |
| 4,296,431 | 10/1981 | Holland | 358/12 |
| 4,300,161 | 11/1981 | Haskell | 359/142 |

OTHER PUBLICATIONS

"A Study of High-Definition TV System in the Future," T. Fujio, IEEE Trans. on Brdcstg. 12/78, vol. BC-24, No. 4, pp. 92-100.
"Present Situation of Japanese Satellite Broadcasting for Experimental Purpose," T. Ishida, et al., IEEE Trans. on Brdcstg. 12/79, vol. BC-25, No. 4, pp. 105-112.
"A Universal Weighted Power Function of Television Noise & Its Application to High Definition TV System Design," T. Fujio, IEEE Trans. on Brdcstg. 6/80, vol. BC-26, No. 2, pp. 39-47.
"An Evolutionary Approach to High Definition Television", in Proc. 16th Annual SMPTE Television Conference (*Tomorrow's Television*), C. W. Rhodes, pp. 186-197, Feb. 1982.
"A Compatible High Fidelity TV Standard for Satellite Broadcasting", in *Proc. 16th Annual SMPTE Television Conference (Tomorrow's Television)*, T. W. Robson, pp. 218-236, Feb. 1982.
"High Definition Television Systems: Desirable Standards, Signal Forms, and Transmission Systems", *IEEE Trans. Comm.*, T. Fujio, vol. COM-29, No. 12, pp. 1882-1890, Dec., 1981.
"Compatible Systems for High-Quality Television", *SMPTE J.*, R. N. Jackson and M. J. J. C. Annegarn, vol. 92, No. 7, pp. 719-723, Jul., 1983.
"Extended Definition Television with High Picture Quality", *SMPTE J.*, B. Wendland, vol. 92, No. 10, pp. 1028-1035, Oct. 1983.
"The Problems and Promises of High-Definition Television", *IEEE Spectrum*, R. K. Jurgen, vol. 20, No. 12, pp. 46-51, Dec., 1983.
"High-Definition Wide-Screen Television System for the Future—Present State of the Study of HD-TV Systems in Japan," T. Fujio, IEEE Trans. On Brdcstg. 12/80, vol. BC-26, No. 4, pp. 113-124.
"The Future of High-Definition Television: First Portion of a Report of the SMPTE Study Group on High-Definition Television," Donald G. Fink, SMPTE Journal, 2/80, vol. 89, No. 2, pp. 89-94.

(List continued on next page.)

*Primary Examiner*—James J. Groody
*Assistant Examiner*—Michael P. Dunnam
*Attorney, Agent, or Firm*—John C. Moran

[57] ABSTRACT

A television system having a fully compatible high-definition signal with extended aspect ratio information receivable at conventional resolution by conventional TV receivers without auxiliary apparatus with one TV channel carrying the conventional TV signal while high-frequency luminance and chrominance information plus extended aspect ratio information are provided in a second TV channel. The extended aspect ratio information including luminance and chrominance information is transmitted during the horizontal retrace interval of the second TV channel. The extended aspect ratio chrominance information comprises $I_e$ and $Q_e$ segments which are transmitted during alternate horizontal retrace intervals. Since the segments are alternately transmitted, a storage mechanism is provided so that a segment received during a previous horizontal retrace interval can be reused during the present horizontal retrace interval for displaying the complete chrominance edge information.

20 Claims, 16 Drawing Figures

OTHER PUBLICATIONS

"The Future of High-Definition Television: Conclusion of a Report of the SMPTE Study Group on High-Definition Television," Donald G. Fink, SMPTE Journal, 3/80, vol. 89, No. 3, pp. 153–161.

"High-Definition Television System-Signal Standard and Transmission," T. Fujio et al., SMPTE Journal, 8/80, vol. 89, No. 8, pp. 579–584.

Fibre Optic Analogue Transmission Experiment for High-Definition Television Signals Using Semiconductor Laser Diodes, Electronics Letters, Jul. 3, 1980, vol. 16, No. 14, pp. 536–538.

"Research and Development on High-Definition Television in Japan," K. Hayashi, SMPTE Journal, Mar. 1981, vol. 90, No. 3, pp. 178–186.

"Magnetic Recording of a High-Definition Television Signal," H. Abe, A. Nagura, H. Katayama, and H. Shibaya, SMPTE Journal, vol. 90, No. 3, Mar. 1981, pp. 192–195.

"High-Definition Television System-Signal Standards and Transmission," T. Fujio et al., IBC 80 International Broadcasting Convention, Brighton UK, Sep. 20–23, 1980, pp. 14–18.

"Development Options for Future Television Systems," Prof. B. Wendland, HDTV Committee Minutes Sponsored by SMPTE.

"High-Definition Television and Compatibility with Existing Standards," C. P. Sandbank and M. E. B. Moffat, Tomorrow's Television Conference, Nashville, Tenn., Feb. 5–6, 1982.

"High-Definition Television Studies on Compatible Basis with Present Standards," Seminar 1982 Sponsored by Department of Communication at University of Dortmund, West Germany, submitted by Prof. B. Wendland.

"Transients in Color Television," P. W. Howells, Proceedings of I-R-E, Jan. 1954, pp. 212–220.

"Transition Effects in Compatible Color Television," J. B. Chatten, Proceedings of the I-R-E, Jan. 1954, pp. 221–227.

"Reproduction of Luminance Detail by NTSC Color Television Systems," D. C. Livingston, Proceedings of the I-R-E, Jan. 1954, pp. 228–234.

"Selected Papers from the Proceedings of the National Television System Committee and its Panels," edited by Donald J. Fink, Television Standards and Practice, 1943.

"Time Frequency Multiplexing (TFM) of Two NTSC Color TV Signals-Simulation Results," B. G. Haskell, Bell System Technical Journal, vol. 60, No. 5, May–Jun., 1981, pp. 643–660.

"The New Mark VIII Automatic Colour Camera," W. T. Underhill, Principles of Video Processing, pp. 12–16.

"Time Compression Multiplexing of Multiple Television Signals in Satellite Channels Using Chirp Transform Processors," Kai Y. Eng, et al., No. 12, 12/81, pp. 1832–1840.

"Signal Processing for Compatible HDTV-Systems, First Results," B. Wendland, Universitat Dortmund, HDTV Colloquium Sponsored by Canadian Government, Ottawa, Canada, Oct. 18–21, 1982, pp. 2.3–2.3–10.

"Networking Aspects of High Definition Television," Arpad G. Toth, Bell-Northern Research, HDTV Colloquium sponsored by Canadian Government, Ottawa, Canada, Oct. 18–21, 1982, pp. 2.1-1–2.1-13.

"Compatibility Aspects of HDTV," Kerns H. Powers, RCA Laboratories, HDTV Colloquium Sponsored by Canadian Government, Ottawa, Canada, Oct. 18–21, 1982, pp. 1.6-1–1.6-17.

"Universal Weighted Power Function of Television Noise and Its Application to High Definition TV System Design," T. Fujio, SMPTE Journal, vol. 89, No. 9, Sep. 1980.

"Transmission Primaries and Signal Forms," by T. Fujio and K. Kupota, NHK Technical Monograph No. 32, Jun. 1982.

"Towards the Implementation of a Compatible HDTV System in North America," by C. W. Rhodes, High Definition TV Colloquium Post Conference Proceedings 1982, Ottawa, Ontario, Canada, Oct. 18–21, 1982, p. 1.5.

ASPECT RATIO IMPROVEMENT FOR COMPATIBLE HIGH-DEFINITION TELEVISION

CROSS-REFERENCE TO RELATED APPLICATIONS

The following U.S. applications were filed on Jan. 16, 1984 and assigned to the same assignees as this application: T. S. Rzeszewski 2, "Single Sideband Modulated Chrominance Information for Compatible High-Definition Definition Television", Ser. No. 571,117; and T. S. Rzeszewski 3, "Time Multiplexing Chrominance Information for Compatible High-Definition Television", Ser. No. 571,183.

The following U.S. application was filed on Jan. 28, 1983, and assigned to the same assignees as this application: T. S. Rzeszewski 1, "Fully Compatible High-Definition Television", Ser. No. 462,065.

TECHNICAL FIELD

This invention relates to a system for improving television picture quality and particularly to encoding and decoding facilities for use in a system that provides an improved aspect ratio to specially designed receivers and a signal of usual quality to conventional receivers without alteration.

BACKGROUND OF THE INVENTION

Within the television (TV) industry, aspect ratio is defined to be the ratio of the width of a picture to its height. In the present United States television picture as specified by the National Television Standards Committee (NTSC), the aspect ratio is 4 to 3. A motion picture screen in a commercial theater has an aspect ratio of at least 5 to 3. Studies have shown that the present NTSC television picture aspect ratio of 4 to 3 is not desirable from a human factors point of view for certain types of production techniques. For example, the article entitled "High-Definition Wide-Screen Television System for the Future", Takashi Fujio, *IEEE Transactions On Broadcasting*, Vol. BC-26, No. 4, Dec. 1980, pp. 113–124, indicates that the 5 to 3 aspect ratio is desirable for a television picture. The desirability of a larger aspect ratio than the present NTSC becomes much more important when the resolution of the picture is increased. The higher resolution picture allows scenes to be displayed at a distance rather than only close up while still retaining picture detail. Since many production techniques can make advantageous use of a wider screen for displaying scenes at a distance, the need for a larger aspect ratio arises. However, it has long been recognized that the human eye tends to focus on the center of a screen and is not conscious of the edges. Hence, the same degree of resolution is not needed at the edge of a picture as required at the center.

An approach to providing high-definition television that could be received as a conventional television picture by conventional television receivers operating according to the NTSC standard or that could be received as a high-definition television picture by newly designed receivers without requiring prohibitively large amounts of bandwidth is disclosed in the above-identified application of T. S. Rzeszewski 1, "Fully Compatible High-Definition Television", Ser. No. 462,065. In that system, one television channel carries the conventional information while high-frequency luminance and high-frequency chrominance information are provided in a second television channel. That system has an aspect ratio of 4 to 3. Whereas, for many applications the aspect ratio of 4 to 3 is suitable, there exist applications for which a greater aspect ratio is desirable.

Therefore, there exists a need for a high-definition television system that is compatible with the standard NTSC system but that can also provide improved aspect ratio information without requiring a greater bandwidth than that provided by two television channels.

SUMMARY OF THE INVENTION

The foregoing problems are solved and a technical advance is achieved in accordance with the principles of this invention incorporated in an illustrative method and structural embodiment in which high-definition television picture signals with improved aspect ratio information are provided that can be received on conventional unmodified television sets and that can be received on modified receivers by the utilization of two conventional broadcast television channels. The conventional television signal is transmitted in one channel, and the other channel communicates the high-frequency luminance and chrominance information. Advantageously, the additional aspect ratio information is transmitted during the horizontal retrace interval of the other television channel relying on the conventional television channel to provide horizontal synchronization information for both television channels.

Advantageously, a television receiver designed in accordance with our invention decodes the conventional luminance and chrominance information using standard techniques and is responsive to the high-frequency luminance and chrominance information in the other channel to also decode that information. In addition, that receiver is responsive to the extended aspect ratio information transmitted during the horizontal retrace interval of the other channel to gate the extended aspect ratio luminance and chrominance information from the other channel so that it can be filtered and properly translated in frequency. The receiver then combines the conventional luminance and chrominance information and the high-frequency luminance and chrominance information with the processed extended aspect ratio luminance and chrominance information for purposes of display.

In addition, the extended aspect ratio chrominance information ($I_e$ $Q_e$ segments) is placed in alternate horizontal retrace intervals. Since the $I_e$ and $Q_e$ segments are alternately received, the receiver provides a storage mechanism for storing the segment received on a previous interval so that this segment can be reutilized with a present segment during the present horizontal information interval.

Advantageously, the extended aspect ratio luminance and chrominance information from a high-resolution TV camera is encoded into the horizontal retrace interval of the other television channel by modulating the luminance and chrominance information before insertion into the horizontal retrace interval. The extended aspect ratio chrominance information comprises $I_e$ and $Q_e$ segments that are transmitted in alternate horizontal retrace intervals. The conventional chrominance and luminance information is encoded into a conventional television channel. The high-frequency luminance and chrominance information is encoded into the other television channel. The encoded high-frequency chrominance information is alternately transmitted during active horizontal intervals.

The novel method is provided for encoding high-definition luminance and chrominance information from a high-definition video camera into conventional luminance and chrominance information communicated in a first TV channel, high-frequency chrominance and luminance information communicated in a second channel, and extended aspect ratio luminance and chrominance information communicated in the horizontal retrace interval of the second TV channel. The steps involve encoding the low-frequency luminance and chrominance information into the first TV channel, encoding the high-frequency luminance and chrominance information into the second TV channel, filtering the extended aspect ratio luminance and chrominance information from the high-definition luminance and chrominance information, gating and encoding the filtered extended aspect ratio luminance and chrominance information into the horizontal retrace interval of the second TV channel, and transmitting the first and second TV channels to TV receivers.

At the receivers, the method provides for decoding the first and second channels by the following steps: decoding the low-frequency luminance and chrominance information, decoding the high-frequency luminance and chrominance information, decoding the extended aspect ratio luminance and chrominance information, and combining the decoded low-frequency luminance and chrominance information, the decoded high-frequency luminance and chrominance information, and the decoded extended aspect ratio luminance and chrominance information together for display purposes.

Our invention particularly pertains to high-definition signal encoding and decoding method and apparatus illustratively embodied in video signal processing in the TV transmitter, and in TV receivers for high-definition picture display with extended aspect ratio information.

BRIEF DESCRIPTION OF THE DRAWING

In general, system elements, when first introduced on a figure, are each designated with a number that uses the figure number as the most significant digits of the element number.

GENERAL DESCRIPTION

The following describes a TV system that is fully compatible with conventional NTSC TV receivers and also capable of displaying high resolution and extended aspect ratio TV pictures on the system's specially designed receivers. The system uses one TV channel for carrying the conventional TV signal and a second channel for carrying the high-frequency luminance and chrominance information plus the extended aspect ratio information. During the active horizontal line time of the first TV channel, a high-definition signal from a wideband video source is separated into low-frequency and high-frequency signals. The low-frequency signal is encoded and transmitted in the first channel, and the high-frequency signal is encoded and transmitted in the second channel. During the synchronization and retrace interval of the first channel, the high-definition signal is band-limited, encoded, and transmitted in the second channel in order to provide extended aspect ratio information to the specially designed receivers. The latter are responsive to both channels to display high resolution TV pictures with extended aspect ratio information.

Figure 1:
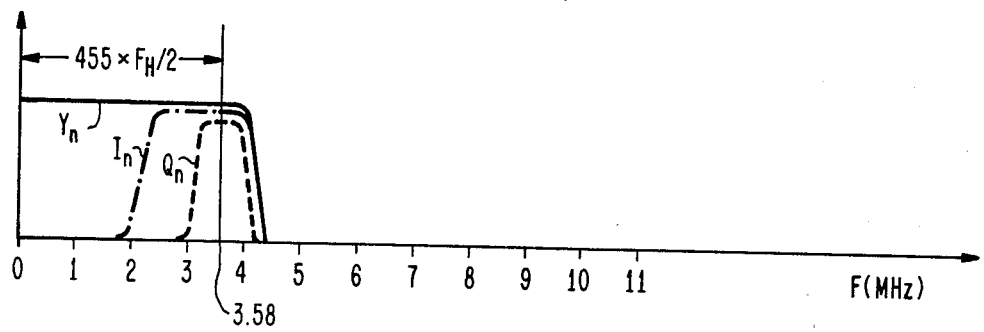
FIG. 1 shows the amplitude-frequency characteristics of the conventional baseband video signal.

FIG. 1 shows the nominal baseband amplitude-frequency characteristics of the video signal at the transmitter in the conventional NTSC system. The frequency of the chrominance subcarrier $F_{sc}$ is displaced by the 455th harmonic of half the horizontal line-scanning frequency $F_H$ from the origin. This relationship was chosen to take advantage of the fact that the luminance spectra, $Y_n$, is actually not continuous (as shown) but exists as a multiplicity of groups of signals (not shown) centered about the harmonics of the line-scanning frequency $F_H$. The chrominance subcarrier $F_{sc}$ is set at a frequency which is an odd harmonic of half the line-scanning frequency, so as to lie in a valley between two of such signal groups.

Figure 2:
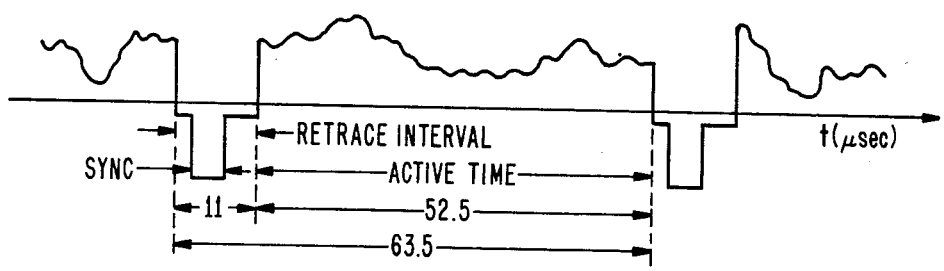
FIG. 2 shows the NTSC standard video wave form.

The chrominance subcarrier $F_{sc}$ is conventionally quadrature amplitude modulated by two chroma signals designated $I_n$ and $Q_n$ in FIG. 1. The $Q_n$ chroma signal reproduces colors from the yellow-green to purple, while the $I_n$ chroma signal transmits hues ranging from bluish-green (cyan) to orange. The $I_n$ chroma signal contains both double sideband and single sideband portions (it is a vestigial sideband signal). The double sideband portion extends 0.5 megahertz (MHz) on either side of the in-phase chrominance subcarrier. The single sideband portion extends from 0.5 to 1.5 MHz below the in-phase chrominance subcarrier. The narrow band $Q_n$ chroma signal is double sideband, extending 0.5 MHz on either side of the quadrature chrominance subcarrier. The normal NTSC video signal uses a 15.7 kilohertz (kHz) scan rate resulting in 63.5 microsecond scan periods. The normal NTSC video signal allots approximately 11 microseconds (referred to as the horizontal retrace interval) in each 63.5 microsecond scan period for synchronization and blanking information resulting in 52.5 microseconds for an active video signal time. This nominal video waveform is illustrated in FIG. 2. With a 15.7 kHz line scan rate and utilizing 52.5 microseconds out of each 63.5 microsecond scan period, the NTSC video signal delivers a 4 to 3 aspect ratio picture to a conventional TV receiver.

Figure 3:
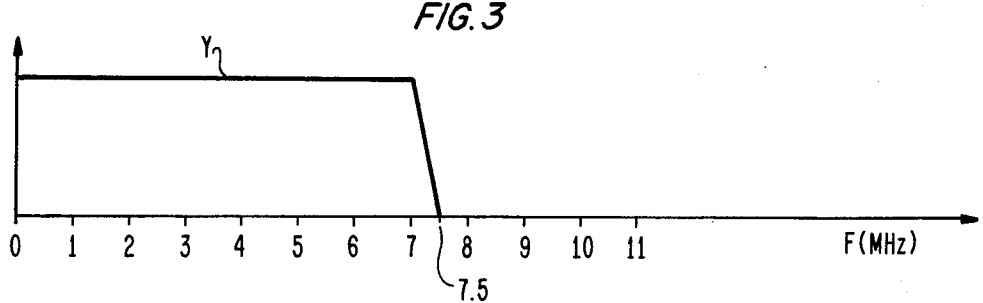
FIG. 3 shows the baseband amplitude-frequency characteristics of a wideband video luminance source.
Figure 4:
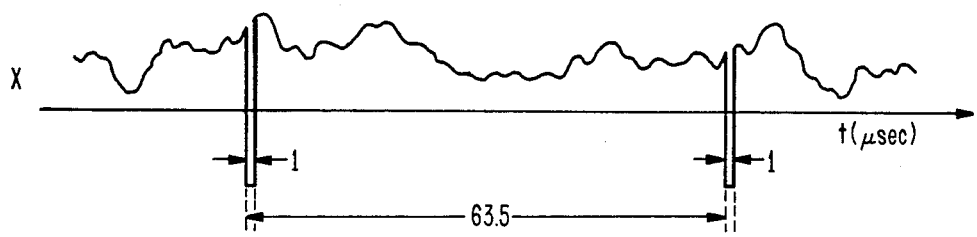
FIG. 4 shows a video signal illustratively capable of providing an aspect ratio of 4.76 to 3 with a 63.5 microsecond horizontal interval.

In FIG. 3, the baseband amplitude-frequency characteristic of a wideband video source having an illustrative luminance bandwidth of 7.5 MHz, adequate to provide a horizontal resolution of 600 lines, is shown. This broadened baseband source is assumed to be provided by improved camera technology which is described in greater detail with respect to FIG. 10 and 11. This improved camera technology produces a video signal, X, as illustrated in FIG. 4 that provides 62.5 microseconds of active time per each horizontal scan line at a 15.7 kHz scan rate. This video signal illustratively provides an aspect ratio of 4.76 to 3 with 1 microsecond being allowed for the active horizontal retrace interval. The format of the X signal represents the format of both the luminance information, Y, and the chrominance information, C (which comprises I and Q signals), from the improved camera. If the horizontal retrace interval can be reduced to 0.1 microsecond, the aspect ratio can be increased to 4.83 to 3, with 4.84 to 3 being the theoretical maximum as the retrace interval goes to zero.

Figure 5:
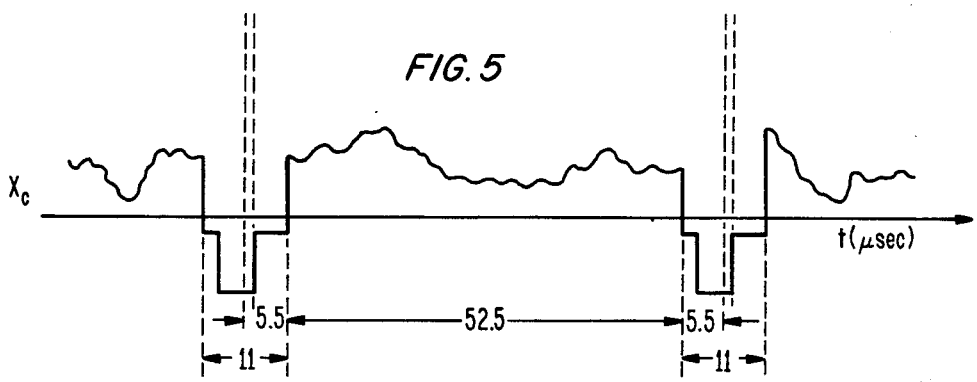
FIG. 5 illustrates the center information of FIG. 4 including synchronization and blanking signals.
Figure 6:
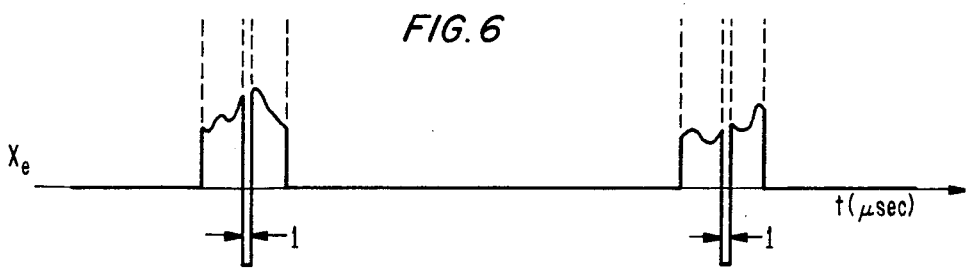
FIG. 6 illustrates the edge information of the video signal illustrated in FIG. 4.

The encoder of our system proportions the X signal illustrated in FIG. 4 into a center portion, $X_c$, as illustrated in FIG. 5 and into an edge portion, $X_e$, as illustrated in FIG. 6.

Figure 7:
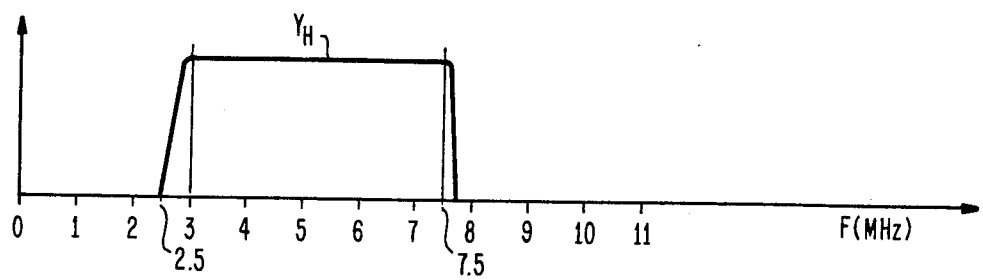
FIG. 7 shows the results of high-pass filtering the baseband amplitude-frequency characteristics of FIG. 3.
Figure 8:
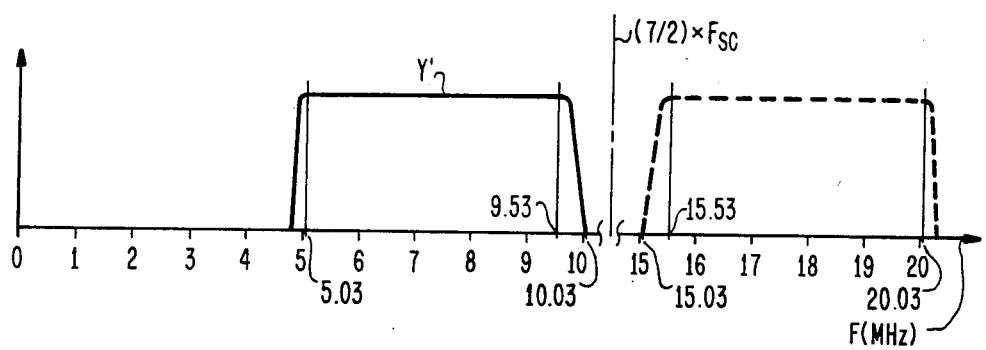
FIG. 8 shows the two sidebands produced by modulating the signal of FIG. 7.

When the wideband luminance source signal, Y of FIG. 3, is presented to both a conventional (NTSC) encoder (after gating with the center signal of FIG. 12) and to a high-pass filter, the NTSC encoder accepts the lower 4.2 MHz of the 7.5 MHz luminance signal as shown in FIG. 1, and the high-pass filter, with a cutoff frequency of approximately 3 MHz communicates a luminance output, $Y_H$, as shown in FIG. 7 of approximately 5 MHz. The luminance output $Y_H$ is delivered to a balanced modulator, advantageously of the "product" type, having a local oscillator whose frequency is set at 7/2 times the frequency of the chrominance subcarrier $F_{sc}$ embedded in the NTSC portion of FIG. 1. The modulator's output contains the upper and lower sideband signals shown in FIG. 8. The upper sideband of FIG. 8 is suppressed and the lower sideband is added to the conventional NTSC portion to yield the composite baseband amplitude-frequency characteristic (exclusive of the high-frequency chrominance information, C') shown in FIG. 9.

Figure 9:
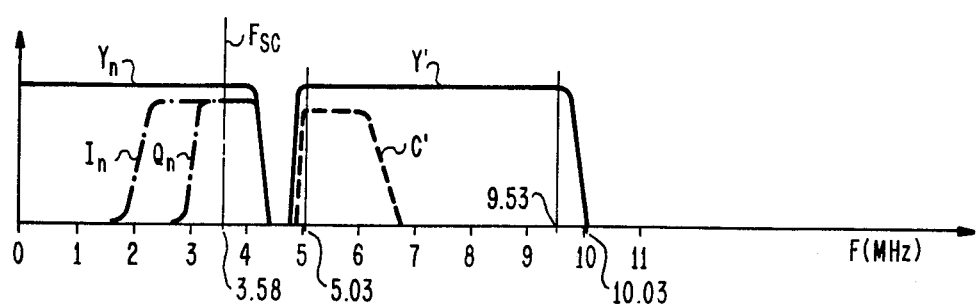
FIG. 9 shows the composite baseband amplitude-frequency characteristics including the high-frequency chrominance and luminance information.

As illustrated in FIG. 9 the conventional NTSC chrominance information comprising the normal NTSC chroma information ($I_n$ and $Q_n$) is transmitted in the conventional manner in the lower portion of FIG. 9 which is a conventional television channel. High-frequency chrominance information, C', in the form of the $X_c$ signal of FIG. 5 is also transmitted in the Y' portion of the composite baseband amplitude-frequency characteristics shown in FIG. 9. The high-frequency chrominance information, C', which consists of I' and Q' components is in the frequency spectrum between 0.5 MHz to 2 MHz as received from the high-definition TV camera. The I' and Q' signals are communicated in a time multiplexed manner. During any given active time either Q' or I' is transmitted along with the Y' signal (frequency interlaced) of FIG. 9 with the other color component being transmitted in the next active horizontal interval.

The edge luminance and chrominance information in the form of the $X_e$ signal is transmitted during the 11 microsecond horizontal retrace interval of the second channel (Y' and C') illustrated in FIG. 9. This horizontal retrace interval corresponds in time to the horizontal retrace and synchronization interval of the first channel. This information can be transmitted during the horizontal retrace interval in the second channel since the horizontal sync pulse and color burst information are transmitted in the first channel as part of the standard NTSC signals. To utilize the 10 microseconds of the available 11 microseconds in the horizontal retrace interval of the second channel for transmission of the $X_e$ form signals, it is necessary to first band limit the luminance signal, Y, to 5.2 MHz and the chrominance signals, Q and I to 1.5 MHz. These signals, after being band limited, are then modulated in a similar manner in which the Y' and C' signals in the format of the $X_c$ signal were modulated before being inserted into the horizontal retrace interval of the second channel.

DETAILED DESCRIPTION

Figure 10:
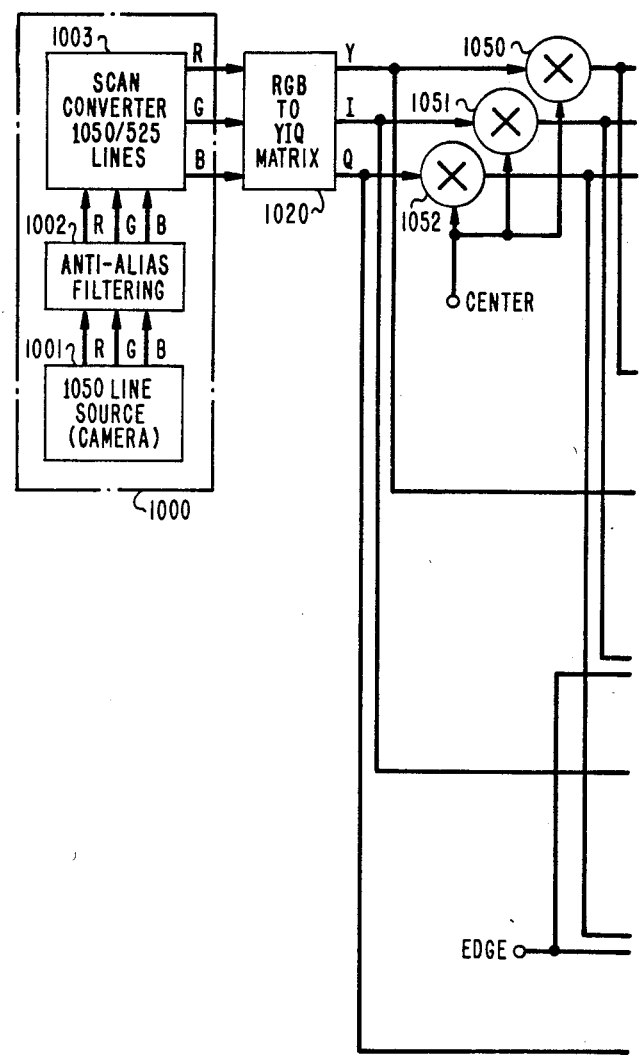
FIGS. 10 and 11 are a block diagram of the high-definition encoder of our invention.
Figure 11:
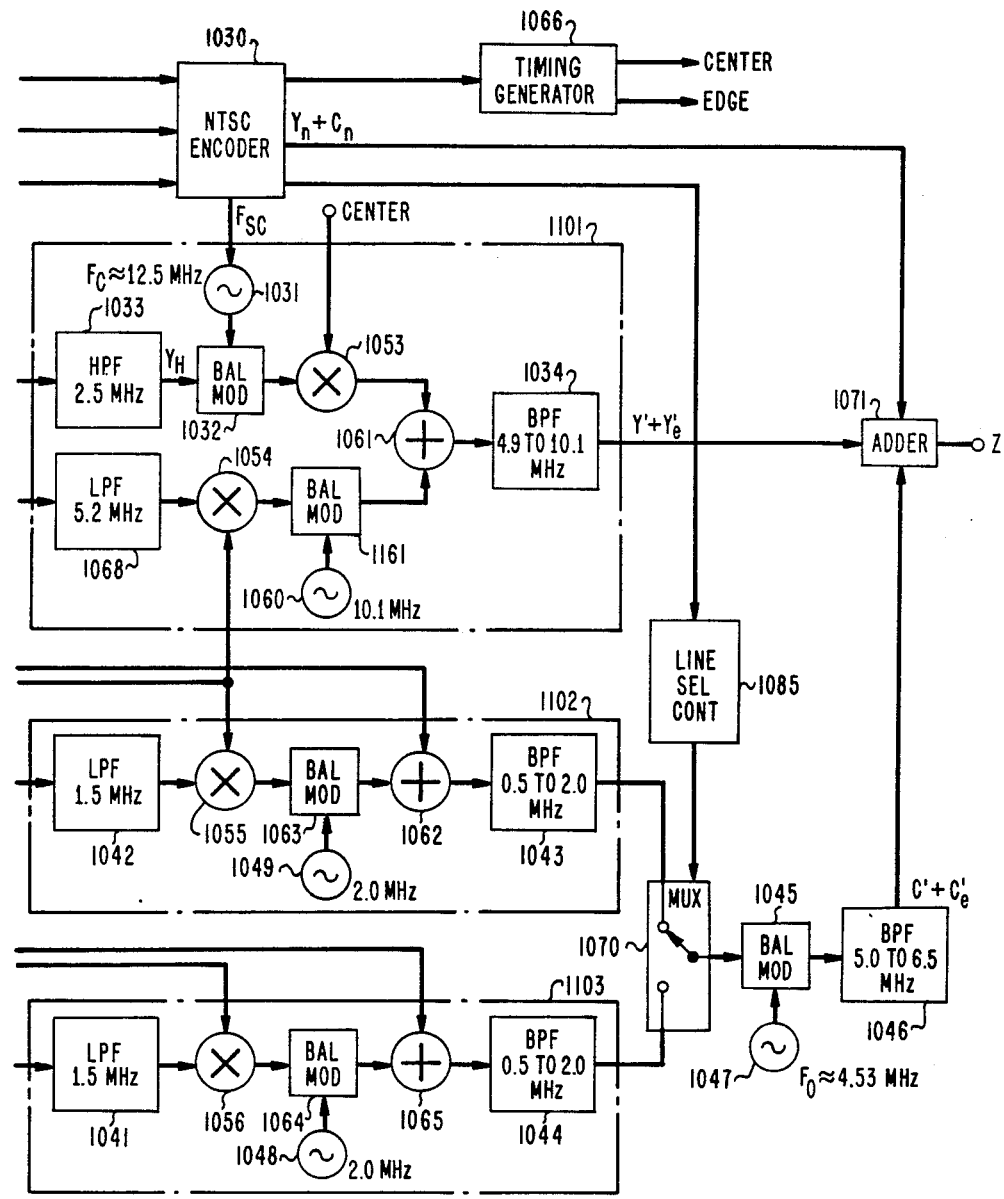

Referring now to FIG. 10 and 11, a block diagram of an extended aspect ratio high-definition TV encoder is described. The increased bandwidth baseband signal of FIG. 3 is provided by circuit 1000. Circuit 1000 advantageously may be of the type described in the article "Concepts for a Compatible HI-FI Television System" by B. Wendland in *NTG-FACHBER*, (Germany), Vol. 7, September, 1980, at pp. 407–416. That article describes an improved video source camera 1001 capable of providing an output having more than the conventional number of scanning lines. The circuit 1000 is further improved so as to provide the additional active information in a horizontal scan line as illustrated in FIG. 4. Illustratively, camera 1001 is capable of functioning as a 1050 line source of wideband red, green, and blue (R, G, B) signals. The wideband R, G, B signals from camera 1001 are then subject to the anti-aliasing filtering by circuit 1002 to remove frequency components above the Nyquist rates.

Figure 13:
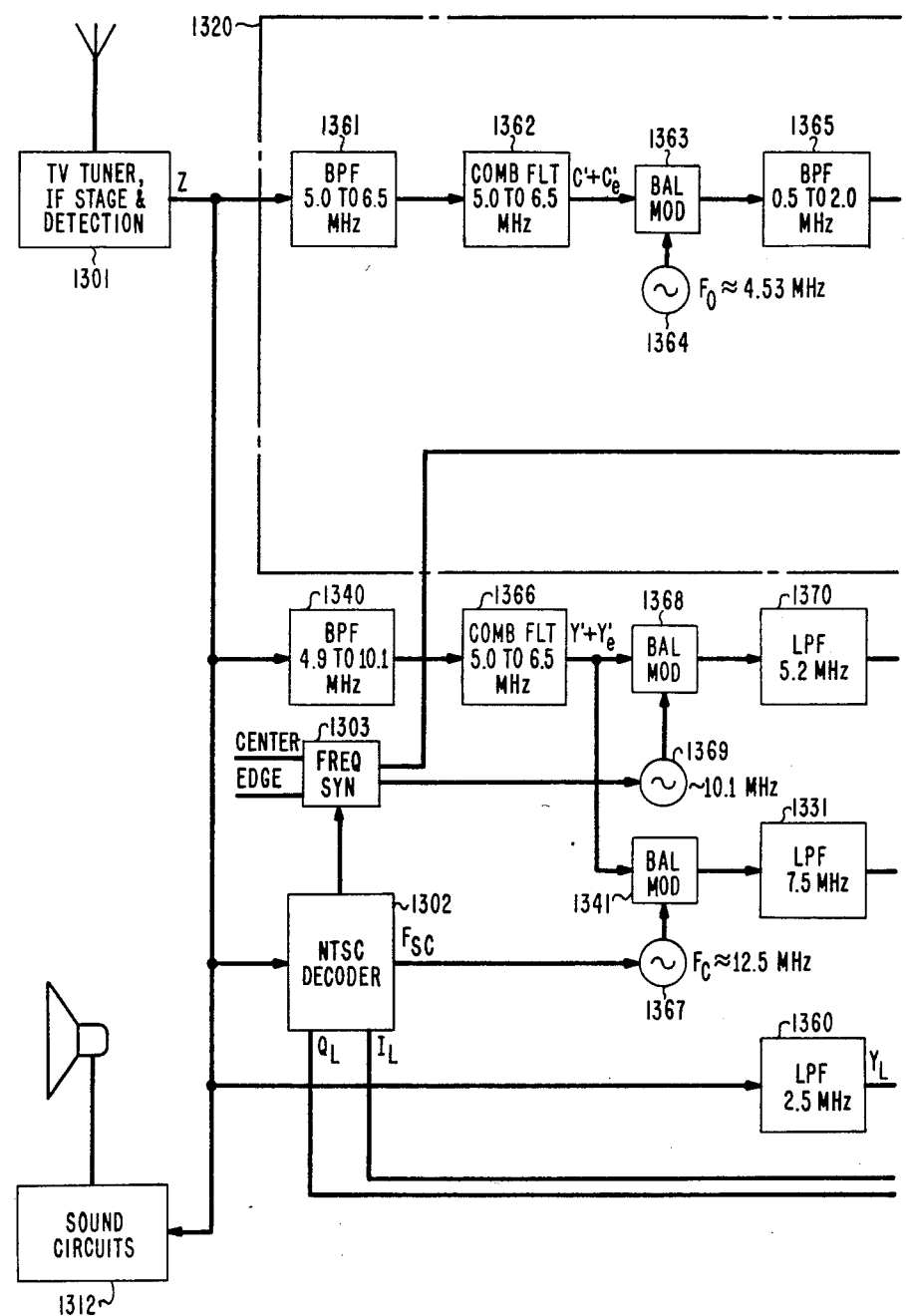
FIGS. 13 and 14 are a block diagram of the high-definition decoder of our invention.
Figure 14:
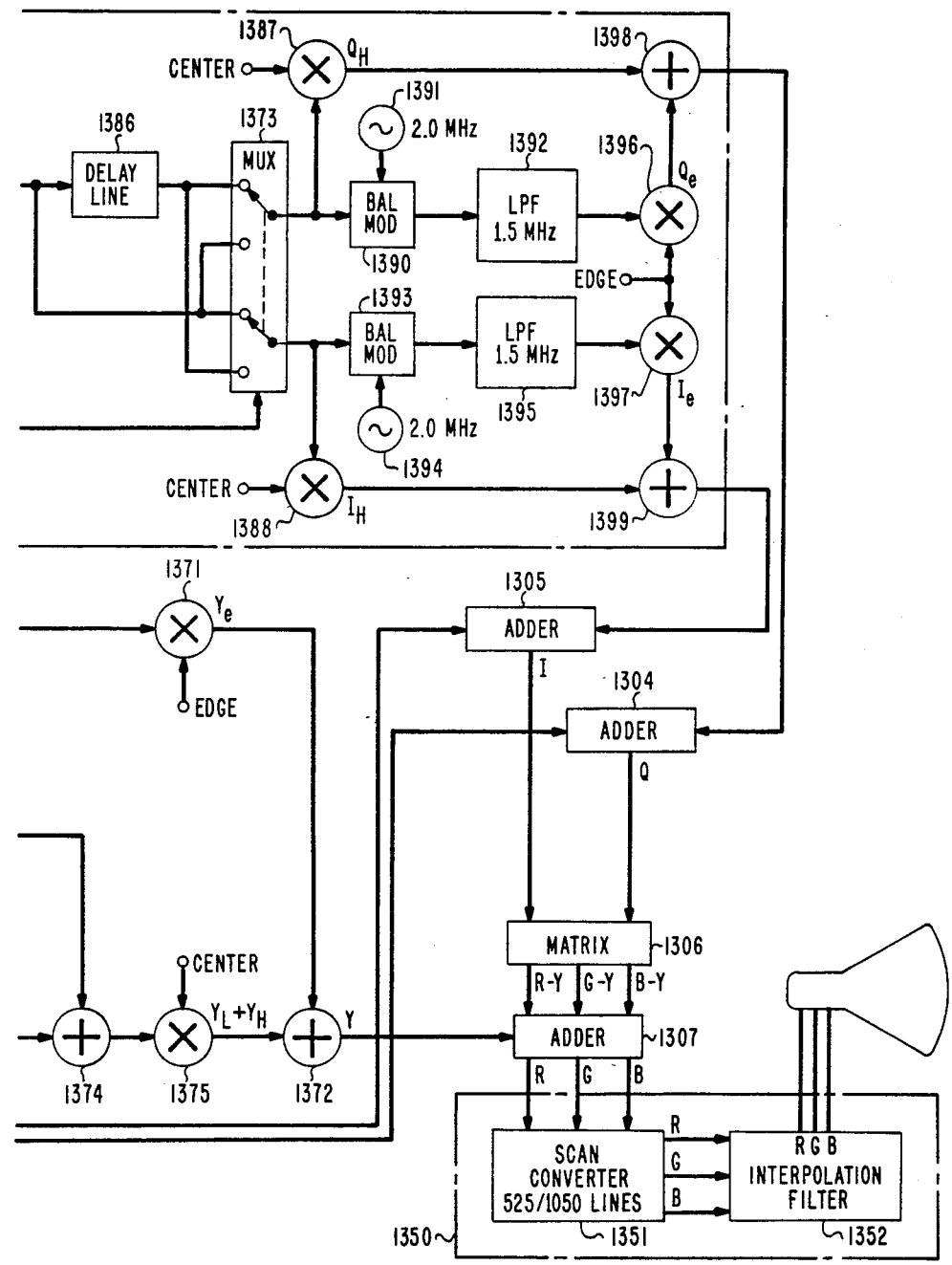

Because the scanning process that changes the image into an electrical signal in the camera and then reassembles the image on the picture tube is really a sampling process, the vertical resolution is usually determined by reducing the effective number of scan lines (the total number less the number of lines in the vertical blanking interval) by a "Kell" factor of 0.6 to 0.7. Vertical filtering of the camera/source signal, however, reduces the affects of aliasing and provides a "Kell" factor approaching unity so that a vertical resolution approaching 483 lines, (525 minus (2×21)) is achieved. The point spread function (PSF) of the camera and the display are analogous to the impulse response of a linear system and are usually adjusted by shaping the electronic beam. However, a narrow PSF in the vertical direction means a wide frequency spectrum and aliasing, and a wide PSF means overlapping of adjacent lines and low-pass filtering in the vertical direction (defocusing). In the NTSC system, the PSF is adjusted to compromise between aliasing and defocusing. Anti-aliasing (prefiltering) is employed in circuit 1000 of the encoder apparatus of FIG. 10 and interpolation (postfiltering) is employed at the corresponding circuit 1350 decoder apparatus of the receiver, (FIGS. 13 and 14).

In circuit 1000, the anti-alias filtered camera signals are applied by circuit 1002 to scan converter 1003. Scan converter 1003 deletes every second line of each of the 1050 line R, G, B signals to obtain a 525 line signal for ultimate transmission that is compatible with the existing (NTSC) television receivers. The wideband R, G, B signals at the output of the scan converter 1003 are applied to the R, G, B to Y, I, Q conversion matrix 1020. The output of matrix circuit 1020 takes the form of the X signal of FIG. 4. Because of the wideband input of the R, G, B signals, the luminance output Y of conversion matrix 1020 exhibits the wideband amplitude-frequency characteristics of FIG. 3.

Figure 12:
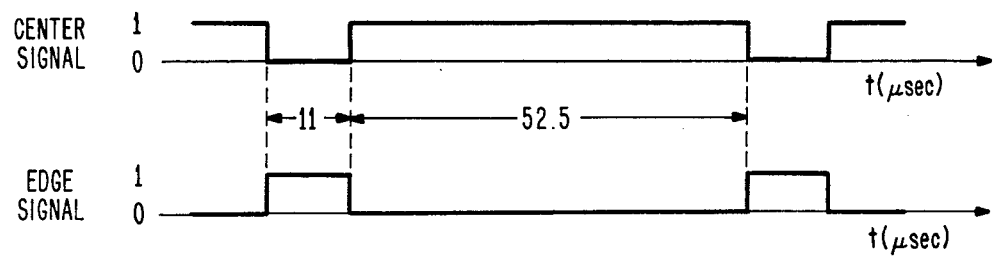
FIG. 12 illustrates the signals generated by timing generator 1066 of FIG. 10.
Figure 15:
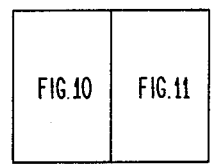
FIGS. 15 and 16 show the manner in which certain of the figures should be arranged to show the specific illustrative embodiment of the invention.
Figure 16:
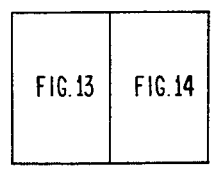

The selection of the information illustrated in FIGS. 5 and 6 from the output of matrix circuit 1020 is controlled by a center signal and an edge signal that are generated by timing generator 1066. The time relationship of the center and edge signals is illustrated in FIG. 12. When the center signal is at the "1" state, the center information illustrated in FIG. 5 is being transmitted from matrix 1020; and when the edge signal is at the "1" state, the edge information illustrated in FIG. 6 is being transmitted from matrix 1020. When the center signal is in the "1" state, the Y, I, and Q signals from matrix 1020 are processed by the NTSC encoder 1030, the Y signal by subcircuit 1101, the I signal by subcircuit 1102, and the Q signal by subcircuit 1103 to produce the two baseband signals illustrated in FIG. 9 that are transmitted after summation by adder 1071 as two conventional TV channels. Gate 1050 is responsive to the center signal to transmit the Y signal from matrix 1020 to the NTSC encoder 1030 and high-pass filter 1033. Gate 1051 is responsive to the center signal to transmit the I signal from matrix 1020 to NTSC encoder 1030 and adder circuit 1062. Correspondingly, gate circuit 1052 is responsive to the center signal to transfer the Q signal to NTSC encoder 1030 and adder circuit 1065.

NTSC encoder 1030 in response to the gated Y, I, and Q signals provides conventional luminance and chrominance output signals, $Y_n + C_n$, to adder 1071. In the absence of any other input, the output of adder 1071 would simply be a conventional NTSC baseband signal communicated to the final video modulator stage (not shown) that would radiate a signal to a designated TV channel according to the frequency of the video carrier selected. However, adder 1071 receives additional inputs C', $C'_e$, Y', and $Y'_e$, to be described, and the latter are transmitted by the final modulator stage (not shown) in the second of two designated TV channels. These channels should preferably be adjacent channels to minimize the affects of weather, however, more widely separated channels may also be employed.

The high-frequency, gated portion of the Y signal from 1020 is modulated and transmitted to adder 1071 by blocks 1033, 1032, 1061, 1034 and 1053. Oscillator 1031 receives the chrominance subcarrier $F_{sc}$ from encoder 1030 and serves as a local oscillator for modulator 1032. The frequency of the local oscillator's output is advantageously chosen to be 7/2 the frequency of the chrominance subcarrier $F_{sc}$. In the NTSC system, where the baseband chrominance subcarrier is $455 \times F_H/2$, the local oscillator frequency, $F_c$, provided by oscillator 1031 to modulator 1032 is approximately 12.53 MHz. The other signal that is received by modulator 1032 is the upper portion of the wideband luminance signal, $Y_H$, which is received from the output of gate 1050 during the active time of the center signal. The output of gate 1050 is first filtered by high-pass filter 1033. Filter 1033 is advantageously chosen to have a crossover frequency of approximately 3 MHz.

In response to these two inputs, the output of modulator 1032 contains the two sideband signals shown in FIG. 8. The upper sideband signal is suppressed by bandpass filter 1034, and the lower sideband signal of Y' is communicated to adder 1071. Before the Y' signal is communicated to filter 1034, it must be communicated through gate circuit 1053 and summation circuit 1061. The purpose of summation circuit 1061 is to allow the luminance signal to consist of either Y' or $Y_e$ depending upon whether the center or edge signal is presently active. The center signal controls gate 1053 to gate the Y' signal to summation circuit 1061 at the proper time, and summation circuit 1061 then communicates the signal to filter 1034. The latter suppresses the upper sideband signal and communicates the lower sideband signal to adder 1071.

During the center time, adder 1071 combines signals $Y_n$ and $C_n$ from NTSC encoder 1030 with the wideband luminance signal Y' from filter 1034 to yield a baseband output signal having the baseband amplitude-frequency characteristics (with the exception of C') of FIG. 9. This baseband amplitude-frequency characteristic is capable of providing a high definition image within a signal spectrum requiring not more than two conventional (6 MHz) video channels.

The definition of the high-frequency chrominance components of the video signal during the center time is also enhanced in the following manner. The gated I and Q signals from matrix 1020 are delivered via summation circuits 1062 and 1065 to filters 1043 and 1044, respectively, which limit each chrominance component to a 1.5 MHz bandwidth extending from 0.5 to 2.0 MHz. These signals are delivered to bandpass filters 1043 and 1044 during the center time by gates 1051 and 1052 responding to the I and Q signals, respectively, from matrix 1020 and gating the signals to summation circuits 1062 and 1065. The band limited outputs of filter 1043 and 1044 are alternately gated at half the normal line rate ($F_H/2$) by color multiplexor 1070 under control of the line selection circuit 1085. Line selection circuit 1085 receives the composite sync signal from NTSC encoder 1030 and controls multiplexor 1070, by counting the sync pulses, so that each new field starts its first line from the I signal output of filter 1043.

The chrominance components I and Q are alternately selected by multiplexor 1070 and are applied to product modulator 1045. The frequency of local oscillator 1047 $F_o$, that is applied to the product modulator 1045 is chosen so that the chrominance output spectra of the modulator interleave, without interference, with the high-frequency luminance spectra of the signals from band-pass filter 1034. Since multiplexor 1070 samples the chrominance components at half the horizontal line rate, the multiplexor's output spectra is naturally grouped at multiples of half the line rate. To avoid this interference with the high-frequency luminance spectra, the local oscillator frequency, $F_o$, as applied to the product modulator 1045 is proportioned according to the formula $F_o = 288\ F_H$ which is approximately 4.53 MHz.

The high-frequency multiplex chrominance components at the output of modulator 1045 are applied to band-pass filter 1046 to eliminate the upper sideband. The upper sideband output, C', of filter 1046 is applied to one input of adder 1071. Since the other inputs of adder 1071 during the center time period are the conventional NTSC baseband signal and the high-frequency luminance signal, Y', the output of adder 1071 provides the composite baseband signal of FIG. 9 including C'.

The edge luminance and chrominance information from matrix 1020 is inserted into the second television channel during the horizontal retrace interval in the following manner. The luminance information, Y, from matrix 1020 is received by low-pass filter 1068 that limits the bandwidth to 5.2 MHz. During the edge time, gate 1054 is responsive to the edge signal from timing generator 1066 to communicate the band limited Y signal from filter 1068 to product modulator 1161. Modulator 1161 translates the band limited Y signal into the proper frequency range of the second channel. The other input to modulator 1161 is a 10.1 MHz signal (a multiple of $F_H$) from oscillator 1060. The output of modulator 1161 is a double sideband suppressed carrier signal which is communicated to band-pass filter 1034 by summation circuit 1061. The upper sideband is eliminated or made into a vestigal sideband signal by band-pass filter 1034 resulting in the $Y'_e$ signal that is communicated by band-pass filter 1034 to adder 1071. The $Y'_e$ signal occupies the same position in the spectrum during the horizontal retrace interval as is occupied by the Y' signal during the center time. During each horizontal scan period, Y' is present during the center time (duration of 52.5 microseconds) and the $Y'_e$ signal is present during the edge time (duration of 10 microseconds).

The chrominance edge information is communicated to the television receiver in the following manner. The I and Q signal from matrix 1020 are first communicated to low-pass filters 1042 and 1041, respectively, in order to band limit the I and the Q signals. The gates 1055 and 1056 produce the band limited chroma signals during only the edge time. These two signals are translated in frequency by modulating with a 2 MHz carrier (a multiple of $F_H$) to produce two double sideband signals that are then passed through 0.5 to 2.0 MHz band-pass filters to suppress the upper sideband signals. The two resulting signals are then alternately selected by multiplexor 1070 and modulated and filtered by circuits 1045 and 1046, respectively, as was previously described for the I' and Q' signals.

Describing this process now in greater detail, the output of low-pass filter 1042 is gated to modulator 1063 during the edge time by gate 1055 responding to the edge signal from timing generator 1066. Modulator 1063 is responsive to the I signal to output a double sideband signal to adder 1062 which transfers it and the center gated I signal to band-pass filter 1043. Filter 1043 suppresses the upper sideband of the signal and makes a resulting single sideband representation of the $I_e$ signal available to multiplexor 1070. Blocks 1041, 1056, 1064, 1048, 1065 and 1044 process the Q signal in the same manner as previously described for the I signal to produce a similar $Q_e$ edge signal. Multiplexor 1070 responds to these signals in the identical manner as previously described for the I' and Q' signals to produce a $C_e$ signal during the edge time which alternately contains the $I_e$ or $Q_e$ signals. Modulator 1045 is responsive to the output of multiplexor 1070 to produce $C'_e$ that alternately contains $I'_e$ and $Q'_e$. Adder 1071 is continuously responsive to the Y', $Y'_e$, C', $C'_e$, $Y_n$ and $C_n$ signals to produce the Z signal as illustrated in FIG. 9 (with $Y'_e$ and $C'_e$ added to Y' and C', respectively) which is then modulated and transmitted over conventional video channels.

A decoder for receiving the signal shown in FIG. 9 is illustrated in FIG. 13. Radio frequency (RF) tuner, video detector, and intermediate frequency (IF) stage 1301 receives the incoming TV signal, i.e., the two TV channels containing the broadband luminance and chrominance information heretofore described. Accordingly, stage 1301 may contain either a broadband RF tuner capable of receiving two adjacent TV channels or separate RF tuners each tuned to a respective channel. In either event, the output of stage 1301 provides the baseband amplitude-frequency characteristic of FIG. 9 with $Y'_e$ and $C'_e$ added to Y' and C', respectively. Stage 1301 is coupled at its output to circuits 1360, 1340, 1302, 1312, and 1361. The low-frequency luminance information, $Y_L$, is recovered by low-pass filter 1360 whose output is communicated to sum circuit 1374. The high-frequency luminance signal, $Y_H$, is recovered by blocks 1340, 1366, 1341, and 1331 during the center time. The $Y_H$ and $Y_L$ signals are combined by sum circuit 1374 and the result is gated to sum circuit 1372 at the center time by gate 1375 in response to the center signal from block 1303.

The Y' signal is recovered from the output of stage 1301 by band-pass filter 1340 limiting the Y signal to a region from 4.9 to 10.1 MHz and comb filter 1366 removing the C' signal. Modulator 1341 and filter 1331 are responsive to the output of comb filter 1366 to deliver a lower sideband signal, 2.5 to 7.5 MHz, containing the Y' information. Modulator 1341 receives a local oscillator input from oscillator 1367 that is 7/2 times the frequency of the color subcarrier $F_{sc}$ as detected by the NTSC decoder 1302. The other input to modulator 1341 is the upper portion of the baseband video signal (Y) in the center of the image extending from approximately 4.9 to 10.1 MHz as shown in FIG. 9 as Y' and separated by band-pass filter 1340 and comb filter 1366. The output of filter 1331 contains the translated $Y_H$ signal and is communicated to sum circuit 1374. Gate 1375 communicates the $Y_L$ and the translated $Y_H$ to sum circuit 1372 only during the center time in response to the center signal from frequency synthesizer 1303.

The luminance information contained in the edge luminance signal, $Y'_e$, is recovered from the output of stage 1301 by the blocks 1340, 1366, 1368, and 1370. Filters 1340 and 1366 filter the $Y'_e$ signal received from stage 1301 in the same manner as was previously described for the Y' signal. The $Y'_e$ signal is then translated down to baseband frequency by modulator 1368 that multiplies the $Y'_e$ signal with a carrier at approximately 10.1 MHz that is derived by oscillator 1369. Low-pass filter 1370 retains only the baseband portion of the output of modulator 1368. The output of low-pass filter 1370, which is $Y_e$, is gated at the edge time to sum circuit 1372 by gate 1371 in response to the edge signal. The output of sum circuit 1372 is the combination of $Y_L$ plus the translated $Y_H$ during the center time and the $Y_e$ signal during the edge time so that adder 1307 is constantly receiving a luminance signal (Y) from sum circuit 1372.

The chrominance information is recovered from the output of stage 1301 in the following manner. NTSC decoder 1302 receives the broadband signal of FIG. 9 with $Y'_e$ and $C'_e$ included from stage 1301 and at its output provides the low frequency $Q_n$ and $I_n$, chrominance signals (band limited to 0.5 MHz) designated $Q_L$ and $I_L$, to adders 1304 and 1305, respectively. Adders 1304 and 1305 combine the $Q_L$ and $I_L$ signals with high frequency chrominance signals ($Q_H$ and $I_H$ translated and center gated) and edge chrominance signals ($Q_e$ and $I_e$ translated and edge gated) that are recovered from the output of stage 1301 by subcircuit 1320.

Subcircuit 1320 demodulates the high frequency chrominance signals, I' and Q' from the output of 1301 in the following manner. The I' and Q' signals are being transmitted on alternate horizontal lines in the upper 6 MHz band by a distant television transmitter. Band-pass filter 1361 is responsive to the output of stage 1301 to limit the signals to the region of 5.0 to 6.5 MHz in which the high frequency and edge chrominance signals are transmitted as shown in the baseband signal of FIG. 9. The comb filter 1362 removes the Y' and Y'$_e$ signals before transmitting the chrominance information to modulator 1363. Modulator 1363 provides a frequency translation function by modulating the chrominance information into the proper chrominance band of 0.5 to 2.0 MHz. The modulator also translates the chrominance information up to the 2F$_o$ range but this is removed by filter 1365. The output of filter 1365 is the C$_H$ signal which alternately comprises I$_H$ and Q$_H$ signals. Since the I' and Q' signals are being alternately transmitted, it is necessary to store one signal from a previous line and reuse it on the present line in order to obtain the desired information. Delay line circuit 1386 performs this storage function. Multiplexor 1373 is responsive to the output of frequency synthesizer 1303 to alternate between the output of bandpass filter 1365 and delay line 1386 so that the information for the Q$_H$ and I$_H$ signals is continuous from multiplexor 1373. The translated Q$_H$ and I$_H$ signals from multiplexor 1373 are communicated by gates 1387 and 1388 in response to the center signal from frequency synthesizer 1303 during the center time to sum circuits 1398 and 1399, respectively. During the center time, sum circuits 1398 and 1399 communicate the translated and gated Q$_H$ and I$_H$ signals to adders 1304 and 1305, respectively. The Q$_L$ signal and the translated and gated Q$_H$ signal are combined by adder 1304, similarly the I$_L$ signal and the translated and gated I$_H$ signal are combined by adder 1305 before transmission to matrix circuit 1306.

The edge chrominance information is handled in a similar manner as the chrominance high-frequency information by subcircuit 1320 with the following exception. The chrominance edge information occupies a bandwidth of 0 to 1.5 MHz and in order to recover this information from the output of multiplexor 1373, it is necessary to frequency translate the outputs of multiplexor 1373 by 2 MHz. The modulators 1390 and 1393 generate both the baseband edge signals and components translated up by 4 MHz. The upper portion of these signals are then eliminated by low-pass filters leaving only the baseband signals that occupy the region from 0 to 1.5 MHz and contain the edge chrominance information. These operations are performed by blocks 1390 through 1395. The resulting outputs of low-pass filters 1392 and 1395 contain the baseband versions of I$_e$ and Q$_e$, respectively, and only need to be gated with the edge signal controlling gates 1396 and 1397, respectively, to produce the desired edge chrominance information. The translated and gate Q$_e$ signal is communicated by gate 1396 to sum circuit 1398 and the translated and gated Q$_H$ signal is communicated by gate 1387 to sum circuit 1398 at the appropriate times. Sum circuit 1398 combines the translated and gated Q$_e$ and Q$_H$ signals before transmission to adder 1304. Similarly, the translated and gated I$_H$ and I$_e$ signals are combined by sum circuit 1399 before transmission to adder circuit 1305. The translated Q$_H$ and I$_H$ signals are transmitted during the center time to adders 1304 and 1305, respectively, while the translated Q$_e$ and I$_e$ signals are transmitted during the edge time to adders 1304 and 1305, respectively. In turn, adders 1304 and 1305 communicate the I and Q signals to matrix circuit 1306.

Matrix circuit 1306 combines the I and Q signals outputted by adders 1305 and 1304, respectively, to produce the R-Y, G-Y, B-Y, signals that are transmitted to adder 1306. Adder 1307, in response to the outputs of adder 1372 and the matrix circuit 1306, produces the R, G, and B signals that are then used to display the video picture by subcircuit 1350.

While the illustrative embodiments of our invention have been described specifically with relation to NTSC standards and protocols, it is to be understood that the principles of our invention are applicable to other standards and protocols, such as PAL. Furthermore, these circuits and amplitude-characteristics which have been described are deemed to be illustrative of the principles of our invention. Numerous modifications may be made by those skilled in the art without departing from the spirit and scope of our invention.

What is claimed is:

1. A system for encoding high-definition luminance and chrominance information from a high-definition video source having low-frequency chrominance and luminance information and high-frequency luminance and chrominance information and extended aspect ratio luminance and chrominance information, said system comprises means for encoding said low-frequency luminance and chrominance information into a first baseband signal;

means for encoding said high-frequency luminance and chrominance information into a second baseband signal;

means for filtering said extended aspect ratio luminance and chrominance information from said high-definition luminance and chrominance information;

means for gating said filtered extended aspect ratio luminance and chrominance information into said horizontal retrace interval of said second baseband signal; and means for transmitting said first baseband signal and said second baseband signal including the gated extended aspect ratio luminance and chrominance information in said horizontal retrace interval thereof.

2. The system of claim 1 further comprises means for generating a center signal during the active horizontal line time of said first baseband signal and means for generating an edge signal during the horizontal retrace time of said first baseband signal;

said transmitting means comprises means responsive to said center signal for transmitting said first baseband signal and said second baseband signal; and means responsive to said edge signal for transmitting said extended aspect ratio luminance and chrominance information.

3. The system of claim 2 wherein said high-frequency luminance and chrominance encoding means further comprises mean responsive to said high-frequency luminance information for modulating said high-frequency luminance information with a signal having a frequency that is a multiple of the frequency of the chrominance subcarrier embedded in said first baseband signal to produce a single sideband signal having spectra that do not overlap the spectra of said first baseband signal.

4. The system of claim 3 wherein said high-frequency luminance and chrominance encoding means further comprises means for multiplexing among successive horizontal lines of said high-frequency chrominance information; and means for modulating said multiplexed high-frequency chrominance information with a signal which is an even multiple of the line scanning rate to provide a single sideband color spectrum that non-interferingly interleaves the high-frequency luminance spectra of said produced sideband signal.

5. The system of claim 4 wherein said extended aspect ratio luminance and chrominance encoding means further comprises means for modulating the extended aspect ratio luminance information with a signal having a frequency that is a multiple of the frequency of said chrominance subcarrier embedded in said first baseband signal to produce another sideband signal having spectra that do not overlap the spectra of said first baseband signal.

6. The system of claim 5 wherein said extended aspect ratio luminance and chrominance information encoding means further comprises means for multiplexing among successive horizontal lines of said extended aspect ratio chrominance information; and means for modulating said multiplexed extended aspect ratio chrominance information with a signal which is an even multiple of the line scanning rate to provide another single sideband color spectrum that noninterferingly interleaves the extended aspect ratio luminance spectra of said produced other sideband signal.

7. A system for encoding high-definition video information from a high-definition video source for providing an improved aspect ratio video display and said high-definition information including high-definition luminance information and high-definition chrominance information, and said system comprises means for defining the active horizontal line time of a first baseband signal;

means for defining the horizontal retrace time of said first baseband signal;

means for gating low-frequency luminance and chrominance signals from said high-definition luminance and chrominance signal during the defined active horizontal line time;

means for encoding the gated low-frequency luminance and chrominance signals into said first baseband signal;

means for gating high-frequency luminance and chrominance signals from said high-definition video signals during said defined active horizontal line time;

means for encoding the gated high-frequency luminance and chrominance signals into a second baseband signal;

means for gating a band limited luminance signal from said high-definition video information during the defined horizontal retrace time;

means for encoding said gated band limited luminance signal into a horizontal retrace interval of said second baseband signal;

means for gating band limited chrominance signal from said high-definition video information during said horizontal retrace time;

means for encoding the gated band limited chrominance signal into said horizontal retrace interval of said second baseband signal; and means for transmitting the encoded first and second baseband signals.

8. The system of claim 7 further comprises means for generating a center signal during said defined active horizontal retrace time to control the gating of said high-frequency luminance and chrominance signals and said low-frequency luminance and chrominance signals; and means for generating an edge signal during said defined horizontal retrace time to control the gating of said band limited luminance and chrominance signals.

9. A system for decoding high-definition information of a high-definition baseband video signal having a first baseband signal including low-frequency luminance and chrominance information and second baseband signal including high-frequency luminance and chrominance information and band limited luminance and chrominance information in the horizontal retrace interval of said second baseband signal to provide extended aspect ratio information; said system comprises means for decoding said low-frequency luminance and chrominance information;

means for decoding said high-frequency luminance and chrominance information;

means for gating said band limited luminance and chrominance information from said horizontal retrace interval of said second baseband signal;

means for decoding said gated band limited luminance and chrominance information; and means for adding the decoded low-frequency luminance and chrominance information and the decoded high-frequency luminance and chrominance information and the decoded band limited luminance and chrominance information for display.

10. The system of claim 9 further comprises means for generating a center signal during the active horizontal line time of said first baseband signal and means for generating an edge signal during the horizontal retrace time of said first baseband signal;

said gating means comprises means responsive to said edge signal for selecting said band limited luminance and chrominance signals;

said adding means comprises means responsive to said center signal for adding said decoded low-frequency luminance and chrominance information and said decoded high-frequency luminance and chrominance information for display; and said adding means further comprises means responsive to said edge signal for adding said decoded band limited luminance and chrominance information for display.

11. The system of claim 10 wherein said band limited chrominance information comprises a first and a second type of chrominance information in alternate horizontal intervals, and said decoding means for said gated band limited luminance and chrominance information comprises means for storing said first type of chrominance information during a first horizontal interval;

means for reading said first type of chrominance information from said first storing means during a second horizontal interval;

means for receiving said second type of chrominance information during said second horizontal interval; and means for multiplexing said read first type of chrominance information and the received second type of chrominance information for transmission to said adding means.

12. The system of claim 11 wherein said multiplexing means comprises means for frequency translating said read first and second types of chrominance information; and means for low-frequency filtering the translated read first and second types of chrominance information.

13. A system for decoding high-definition information of a high-definition baseband video signal having a first baseband signal including low-frequency luminance and chrominance information and a second baseband signal including high-frequency luminance and chrominance information and band limited luminance and chrominance information in the horizontal retrace interval of said second baseband signal to provide extended aspect ratio information; said system comprises means for decoding said low-frequency luminance information by low-pass filtering said high-definition baseband video signal;

means for decoding said high-frequency luminance information by demodulating and low-pass filtering said high-definition baseband video signal;

first adder means for adding said low-frequency luminance information and said high-frequency luminance information to produce a center luminance signal;

means for decoding said band limited luminance information by demodulating and low-pass filtering said high-definition baseband video signal to produce an edge luminance signal;

means for generating a center signal during the active horizontal interval of said first baseband signal;

means for generating an edge signal during the horizontal retrace interval of said first baseband signal;

means for gating said center luminance signal in response to said center signal;

means for gating said edge luminance signal in response to said edge signal;

means for adding the gated center and edge luminance signals to produce a combined luminance signal;

means responsive to said high-definition baseband video signal for filtering out said high-frequency and band limited chrominance information;

means for demodulating the filtered high-frequency and band limited chrominance information;

means responsive to said center signal for gating the demodulated high-frequency chrominance information;

means responsive to the demodulated band limited chrominance information for frequency translating said demodulated band limited chrominance information;

means responsive to said edge signal for gating the translated band limited chrominance information;

adder means responsive to said gated high-frequency chrominance information and the gated band limited chrominance information to produce a combined chrominance signal; and means responsive to said combined luminance and combined chrominance signals for adding the latter for display.

14. The system of claim 13 wherein said band limited frequency chrominance information comprises a first and a second type of chrominance information on alternate horizontal intervals, and said system further comprises first means for storing said first type of chrominance information during a first horizontal interval;

second means for receiving said second type of chrominance information during a second horizontal interval;

means for reading said first type of information from said storing means during said second horizontal interval; and means for multiplexing the read first type of chrominance information and the received second type of chrominance information for transmission to said demodulated band limited chrominance information gating means in response to said edge signal.

15. A method for encoding high-definition luminance and chrominance information from a high-definition video source having low-frequency chrominance and luminance information and high-frequency luminance and chrominance information and extended aspect ratio luminance and chrominance information, comprising the steps of:

encoding said low-frequency luminance and chrominance information into said first baseband signal;

encoding said high-frequency luminance and chrominance information into said second baseband signal;

filtering said extended aspect ratio luminance and chrominance information from said high-definition luminance and chrominance information;

gating said filtered extended aspect ratio luminance and chrominance information into said horizontal retrace interval of said second baseband signal; and transmitting the encoded first baseband signal and the encoded second baseband signal including the gated extended aspect ratio luminance and chrominance information in said horizontal retrace interval thereof.

16. The method of claim 15 further comprises the steps of generating a center signal during the active horizontal line time of said first baseband signal to define said active horizontal line time and generating an edge signal during the horizontal retrace time of said first baseband signal to define said horizontal retrace time.

17. The method of claim 16 wherein said encoding step for said extended aspect ratio luminance and chrominance information comprises the step of modulating the extended aspect ratio luminance information with a signal having a frequency that is a multiple of the frequency of the chrominance subcarrier embedded in said first baseband signal to produce a sideband signal.

18. The method of claim 17 wherein said step of encoding said extended aspect ratio luminance and chrominance information further comprises the steps of multiplexing among successive horizontal lines of said extended aspect ratio chrominance information; and modulating said multiplexed extended aspect ratio chrominance information with a signal which is an even multiple of the line scanning rate to provide a single sideband color spectrum that noninterferingly interleaves the extended aspect ratio luminance spectra of the produced sideband signal.

19. A method for decoding high-definition information of a high-definition baseband video signal having a first baseband signal including low-frequency luminance and chrominance information and a second baseband signal including high-frequency luminance and chrominance information and band limited luminance and chrominance information in the horizontal retrace interval of said second baseband signal, comprising the steps of:

decoding said low-frequency luminance and chrominance information;

decoding said high-frequency luminance and chrominance information;

gating said band limited luminance and chrominance information from said horizontal retrace interval of said second baseband signal;

decoding the gated band limited luminance and chrominance information; and adding the decoded low-frequency luminance and chrominance information and the decoded high-frequency luminance and chrominance information and the decoded band limited luminance and chrominance information fo display purposes.

20. The method of claim 19 further comprises the steps of generating a center signal during the active horizontal line time of said first baseband signal to define said active horizontal line time;

generating an edge signal during the horizontal retrace time of said first baseband signal to define said horizontal retrace time;

said gating step of gating said band limited luminance and chrominance signals further comprises the step of selecting said band limited luminance and chrominance signals in response to said edge signal;

said adding step comprises the step of summing said decoded high-frequency luminance and chrominance information and said low-frequency luminance and chrominance information in response to said center signal for display purposes; and said adding step further comprises the step of summing the selected band limited luminance and chrominance signals in response to said edge signal for display purposes.

* * * * *